United States Patent
Tokumaru

(10) Patent No.: US 8,958,116 B2
(45) Date of Patent: Feb. 17, 2015

(54) INSPECTION APPARATUS, INSPECTION SYSTEM, INSPECTION METHOD, AND STORAGE MEDIUM

(71) Applicant: Canon Kabushiki Kaisha, Tokyo (JP)

(72) Inventor: Akiko Tokumaru, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/105,954

(22) Filed: Dec. 13, 2013

(65) Prior Publication Data

US 2014/0168709 A1  Jun. 19, 2014

(30) Foreign Application Priority Data

Dec. 17, 2012 (JP) ................................. 2012-274643

(51) Int. Cl.
 *G06K 9/00* (2006.01)
 *H04N 1/00* (2006.01)
(52) U.S. Cl.
 CPC ........ *G06K 9/00483* (2013.01); *H04N 1/00278* (2013.01)
 USPC ............ 358/1.18; 358/1.9; 358/405; 382/112
(58) Field of Classification Search
 USPC .......... 358/1.18, 1.9, 405, 1.12; 382/112, 141
 See application file for complete search history.

(56) References Cited

U.S. PATENT DOCUMENTS

| 4,250,806 A * | 2/1981 | Boyson et al. ..................... 101/2 |
| 2013/0250319 A1* | 9/2013 | Kaneko et al. ................. 358/1.9 |
| 2013/0250370 A1* | 9/2013 | Kojima et al. ................ 358/405 |

FOREIGN PATENT DOCUMENTS

| JP | 2005-238817 A | 9/2005 |
| JP | 2006-238817 A | 9/2006 |

* cited by examiner

*Primary Examiner* — Allen H Nguyen
(74) *Attorney, Agent, or Firm* — Canon U.S.A., Inc. IP Division

(57) ABSTRACT

An inspection apparatus includes a receiving unit configured to receive preprint image data preprinted on a sheet and document image data printed on the preprinted sheet, a composing unit configured to compose reference image data from the received preprint image data and the received document image data, a reading unit configured to read the sheet on which both the preprint image data and the document image data has been printed, to obtain read image data, a processing unit configured to carry out predetermined image process on a first and second area corresponding to the document image data and the preprint image data of the read image data, to generate inspection image data, and an inspecting unit configured to inspect the sheet on which both the preprint image data and the document image data has been printed, by comparing the inspection image data with the reference image data.

13 Claims, 6 Drawing Sheets

FIG.5A

| LEVEL | MISMATCH PIXEL COUNT |
|---|---|
| HIGH | 10 OR LESS |
| MEDIUM | 50 OR LESS |
| LOW | 100 OR LESS |

FIG.5B

| LEVEL | MISMATCH PIXEL COUNT |
|---|---|
| HIGH | 10 OR LESS |
| MEDIUM | 50 OR LESS |
| LOW | 100 OR LESS |
| NONE | UNLIMITED |

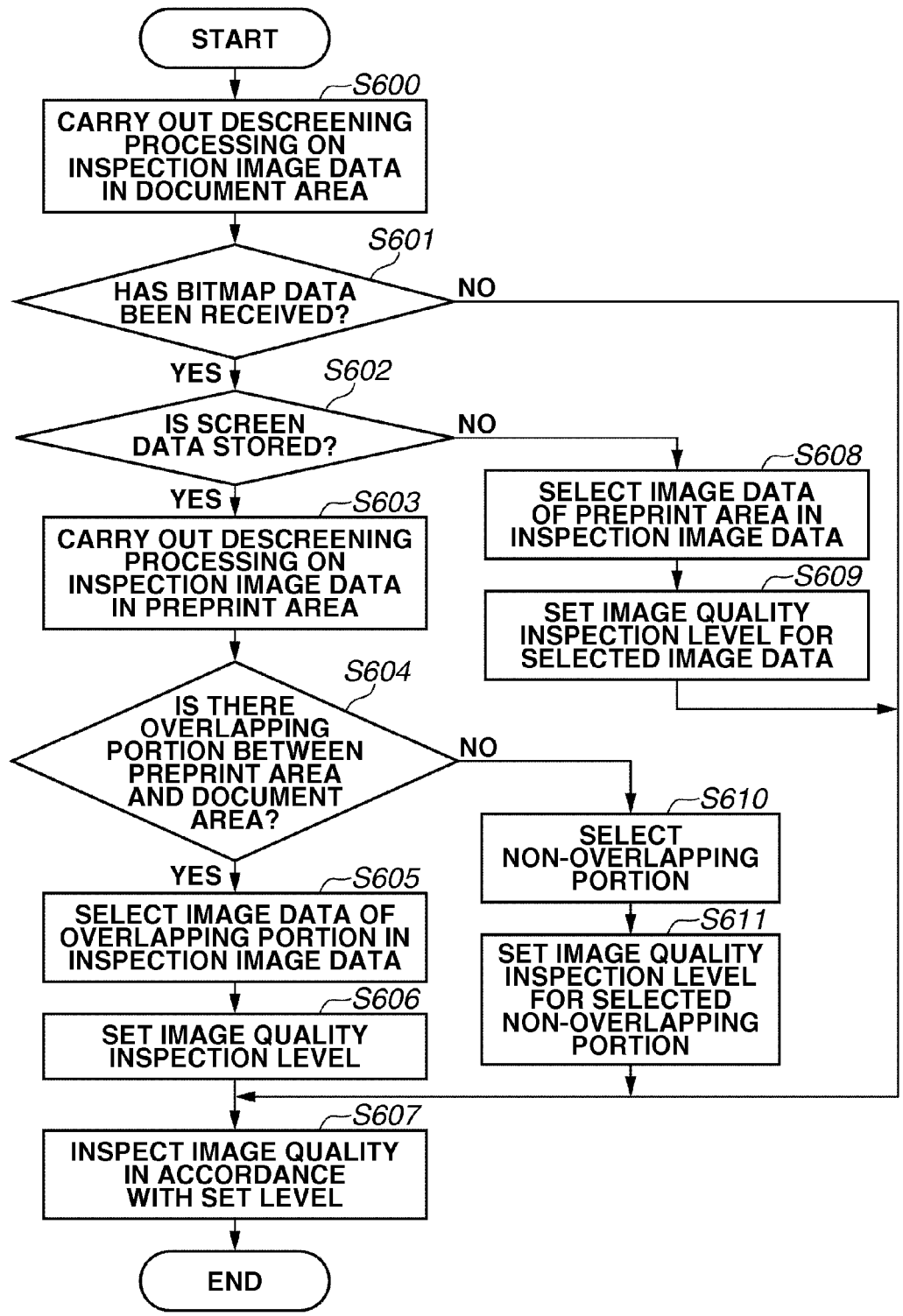

INSPECTION APPARATUS, INSPECTION SYSTEM, INSPECTION METHOD, AND STORAGE MEDIUM

BACKGROUND OF THE INVENTION

1. Field of the Invention

The present invention relates to techniques for inspecting the quality of images printed on sheets.

2. Description of the Related Art

A digital printing technology of print on demand, which is based on an electrophotographic technology, has become widespread in the printing industry, and there is an increasing demand for producing print materials in a required amount efficiently while maintaining the print quality. Nowadays, there is also a need for producing print materials efficiently while maintaining the print quality in ordinary offices.

To date, the image quality of print materials has been inspected typically by an operator visually checking the print materials. Thus, the result is dependent on a sensory evaluation of the operator, and a variation in the inspection level may occur. In addition, the inspection time may vary depending on the skill level of the operator, and as the inspection relies on manpower, there is a limit on how much the inspection time can be shortened. Accordingly, an automatic inspection apparatus has been devised for inspecting the image quality of print materials.

Such an automatic inspection apparatus makes a determination by comparing inspection image data with reference data. The inspection image data corresponds to scan data obtained by reading a printed image by a sensor such as a scanner, and the reference data corresponds to document image data generated in a printing apparatus. The automatic inspection apparatus then determines the print quality of the print material based on whether the inspection image data matches the reference data.

Here, a case will be considered where, in the automatic inspection apparatus, a recording sheet on which printing is to be performed (hereinafter, referred to as a print material) is a recording sheet on which printing has already been performed in another image forming apparatus (hereinafter, referred to as a preprint sheet). Inspection image data obtained by scanning a print material that has been obtained by performing printing on a preprint sheet may be affected by content preprinted on the preprint sheet.

Thus, Japanese Patent Application Laid-Open No. 2006-238817 discusses a technique in which, after a print material that has been obtained by performing printing on a preprint sheet is scanned, inspection image data is generated while masking the preprint portion. This inspection image data is then compared with reference data, and thus the image quality can be inspected without being affected by the preprint printing.

Japanese Patent Application Laid-Open No. 2005-238817 also discusses a method in which inspection image data is generated while masking a preprint of scan data obtained by scanning a print material that has been obtained by performing printing on a preprint sheet. This inspection image data is then compared with reference data, and thus the image quality can be inspected without being affected by the preprint printing.

The assumption in Japanese Patent Application Laid-Open No. 2005-238817, however, is that a formatted document such as an invoice and a delivery note is used as a preprint sheet, and that a print area of document image data may overlap a printed area in a preprint sheet is not assumed.

If, for example, a preprint sheet on which printing has been lightly performed across the entire surface thereof is used, reference data in which the entire print area is masked is generated, leading to a problem that the image quality cannot be inspected.

SUMMARY OF THE INVENTION

The present invention is directed to a mechanism that enables an image quality inspection without being affected by a preprint.

According to an aspect of the present invention, an inspection apparatus includes a receiving unit configured to receive preprint image data preprinted on a sheet and document image data printed on the preprinted sheet, a composing unit configured to compose reference image data from the received preprint image data and the document image data, a reading unit configured to read the printed sheet to obtain read image data, a processing unit configured to carry out predetermined image processing on a first area corresponding to the document image data and a second area corresponding to the preprint image data of the read image data to generate inspection image data, and an inspecting unit configured to inspect the printed sheet by comparing the inspection image data with the reference image data.

Further features of the present invention will become apparent from the following description of exemplary embodiments with reference to the attached drawings.

BRIEF DESCRIPTION OF THE DRAWINGS

FIGS. 5A and 5B are diagrams for illustrating exemplary level settings in an image quality inspection.

FIG. 6 is a flowchart for illustrating another method for controlling the image forming apparatus.

DESCRIPTION OF THE EMBODIMENTS

Various exemplary embodiments, features, and aspects of the invention will be described in detail below with reference to the drawings.

[Explanation on System Configuration]

Hereinafter, a first exemplary embodiment will be described.

Figure 1:
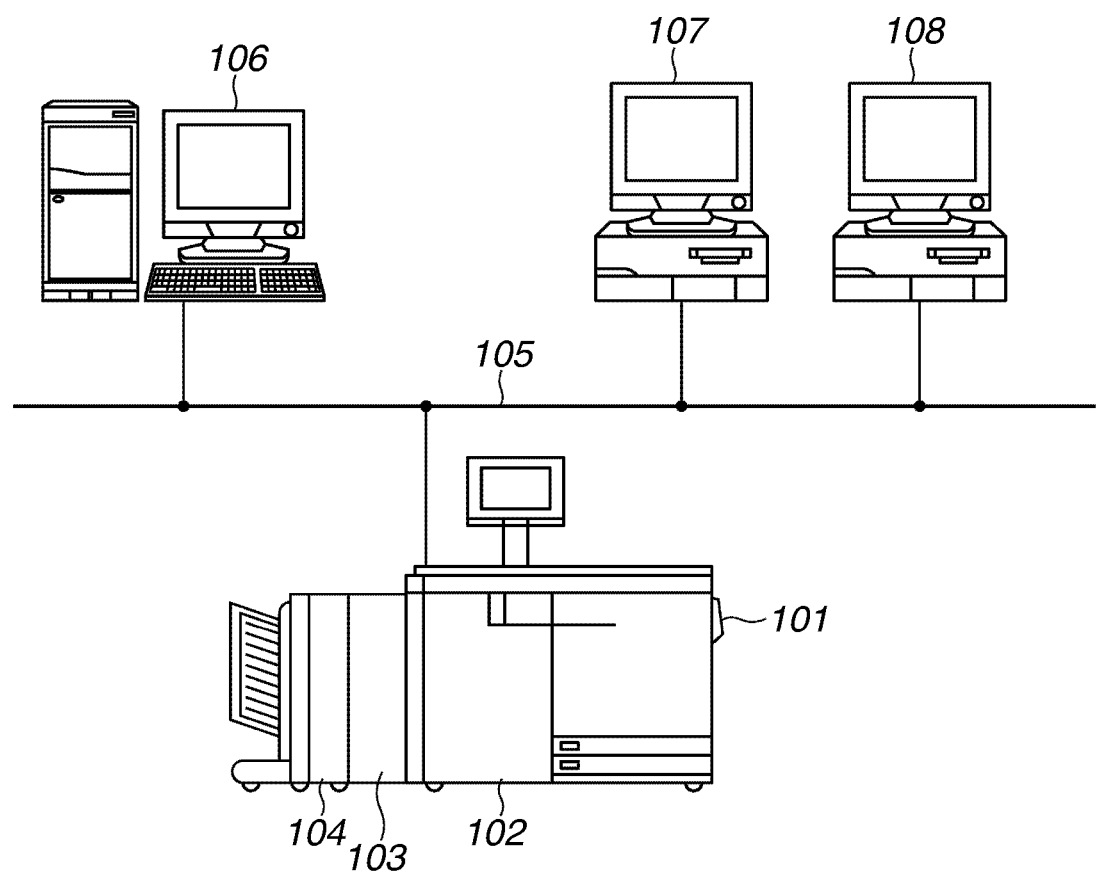
FIG. 1 illustrates an exemplary image forming system.

FIG. 1 illustrates an exemplary image forming system to which an image forming apparatus that includes an inspection apparatus of a first exemplary embodiment is applied. In the first exemplary embodiment, an image forming apparatus 101 can communicate with a print server 106 and client personal computers (PCs) 107 and 108 via a network (local area network (LAN) 105). In addition, the image forming apparatus 101 is constituted by a multifunction printer (MFP).

The image forming apparatus 101 processes input image data and carries out printing. The image forming apparatus 101 includes an image printing unit 102, an image inspection unit 103, and a finishing unit 104. In other words, the image forming apparatus 101 of the first exemplary embodiment can carry out an inline image inspection, in which the image forming apparatus 101 integrally carries out image formation (printing), image inspection (inspection), and finishing. The image printing unit 102 carries out print processing for printing an image on a sheet based on generated image data. The sheet may be a preprinted sheet or a non-preprinted sheet.

The image printing unit 102 carries out the print processing of the image data (hereinafter, referred to as document image data) and prints an image on a recording sheet based on the image data. The print material is then conveyed to the image inspection unit 103.

The image inspection unit 103 inspects the image quality of the print material. The inspected print material is then conveyed to the finishing unit 104. In addition, the result of the image quality inspection is transmitted to the finishing unit 104. The finishing unit 104 discharges the print material received from the image inspection unit 103 to a paper discharge unit according to the received result of the inspection. The LAN 105 is a network for connecting the image forming apparatus 101 to an external apparatus. The print server 106 is connected to the LAN 105.

The client PCs 107 and 108 are connected to the LAN 105 and create print jobs in accordance with user operations. The created print jobs are transmitted to the image forming apparatus 101 through the user instruction, and a series of processes, namely printing, inspection, and finishing, is carried out.

Figure 2:
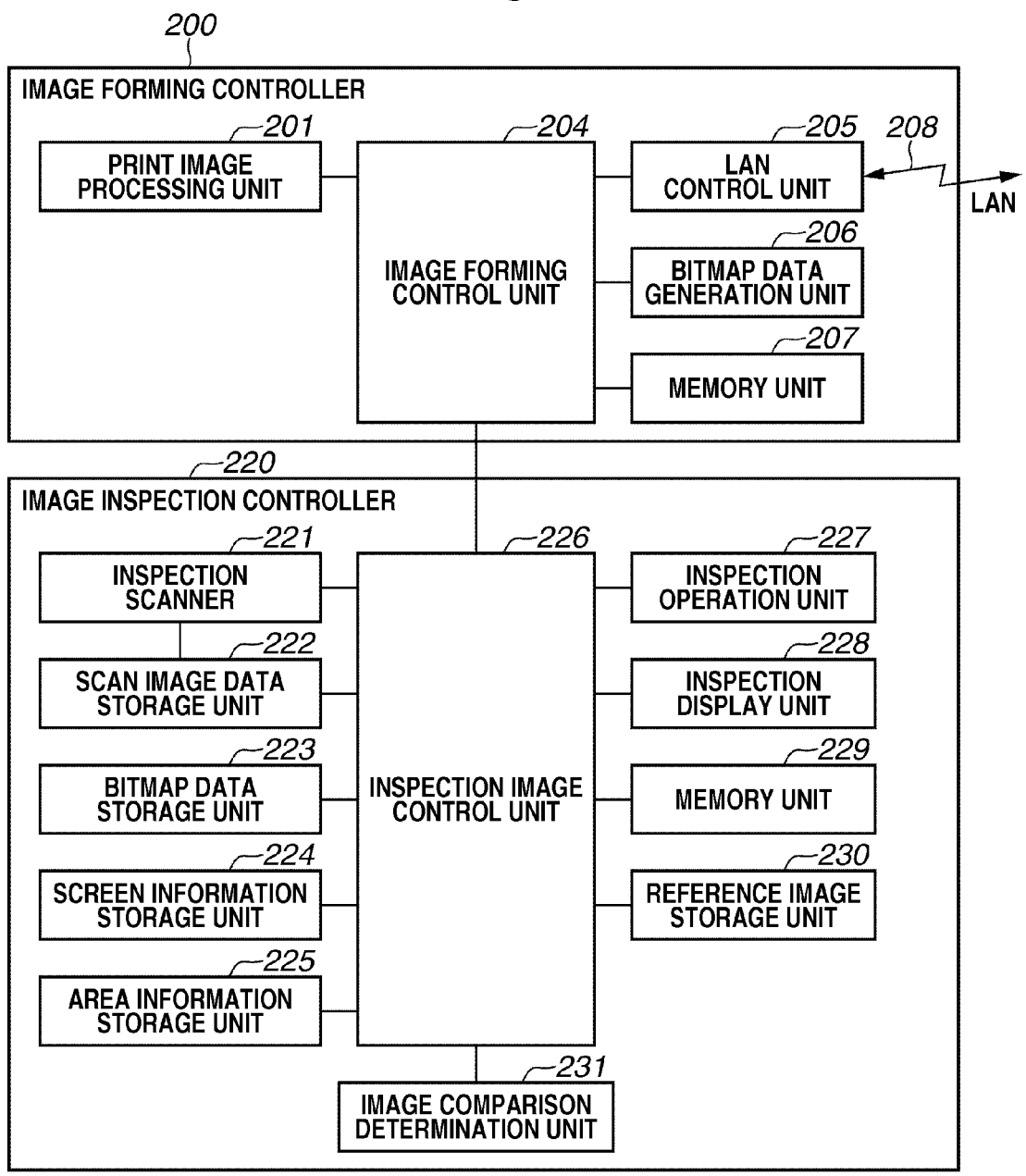
FIG. 2 is a block diagram illustrating a controller configuration of an image forming apparatus illustrated in FIG. 1.

FIG. 2 is a block diagram illustrating a controller configuration of the image forming apparatus 101 illustrated in FIG. 1.

The image printing unit 102, the image inspection unit 103, and the finishing unit 104 included in the image forming apparatus 101 illustrated in FIG. 1 are controlled by an image forming controller 200 and an image inspection controller 220 illustrated in FIG. 2.

With reference to FIG. 2, the image forming controller 200 controls the print processing of the image printing unit 102. The image forming controller 200 is realized by a central processing unit (CPU), a read only memory (ROM), a random access memory (RAM), and a hard disk drive (HDD) (none of which are illustrated) cooperating with one another. The ROM or the HDD stores a program for implementing each processing unit of the image forming controller 200 illustrated in FIG. 2, and the CPU develops and executes the program in the RAM to implement a processing flow illustrated in FIG. 3.

The image forming controller 200 is connected to the print server 106 and the client PCs 107 and 108 via a LAN 208 and transmits and receives data to and from the print server 106 and the client PCs 107 and 108. The LAN 208 corresponds to the LAN 105 illustrated in FIG. 1.

A print image processing unit 201 carries out image processing to have the document image data printed in the image printing unit 102. This image processing includes screening processing for converting continuous tone image data into a halftone image represented by an N value.

An image forming control unit 204 controls each unit in the image forming controller 200. The image forming control unit 204 analyzes document image data, which has rendered by a bitmap data generation unit 206, and determines a print area based on the document image data (hereinafter, referred to as a document area). The image forming control unit 204 then stores a result of the determination, namely, information on the location in the document area, into an area information storage unit 225. The bitmap data generation unit 206 functions as a unit for carrying out first generation processing for generating image data to be printed on a preprinted sheet or on a non-preprinted sheet.

A LAN control unit 205 controls communication carried out via the LAN 208. This communication includes, for example, receiving image data (e.g., page description language (PDL) data) via the LAN 208 and transmitting various pieces of image data and device information in the image forming apparatus 101 via the LAN 208.

The bitmap data generation unit 206 decodes the PDL data input from the print server 106 and the client PCs 107 and 108 via the LAN 208 and renders the data into bitmap data for printing the image. The bitmap data is thus generated through a series of the above processes. In addition, the image forming control unit 204 stores the rendered document image data, which has generated by the bitmap data generation unit 206, into a reference image storage unit 230. The rendered document image data then undergoes screening processing by the print image processing unit 201 and is printed by the image printing unit 102.

A memory unit 207 includes a control memory for the image forming control unit 204 to carry out various types of control and a program memory for storing a program for the control.

The image inspection controller 220 controls the inspection processing of the image inspection unit 103. The image inspection controller 220 is realized by a CPU, a ROM, a RAM, and an HDD (none of which are illustrated) cooperating with one another. The ROM or the HDD stores a program for implementing each processing unit of the image inspection controller 220 illustrated in FIG. 2, and the CPU develops and executes the program in the RAM to implement the processing flow illustrated in FIG. 3.

An inspection scanner 221 scans, in the image inspection unit 103 illustrated in FIG. 1, the image printed on the recording sheet. In the first exemplary embodiment, the inspection scanner 221 is an image scanner that includes a light source and a line sensor for reading, and reads the image while scanning the surface of the recording sheet. A scan image data storage unit 222 stores the image data of the print material printed on the preprint sheet, which has been read by the inspection scanner 221. The inspection scanner 221 carries out reading processing for reading the image printed on the sheet.

The bitmap data storage unit 223 stores bitmap data transmitted from another image forming apparatus via the LAN 208 in response to a request from an inspection image control unit 226. This bitmap data corresponds to preprinted image data (hereinafter, referred to as preprint image data). In the first exemplary embodiment, the inspection image control unit 226 carries out function processing for generating inspection image data by carrying out predetermined image processing on either image data of a first area or image data of a second area, of image data output from the inspection scanner 221. The first area corresponds to the area of the image printed on the sheet by the image printing unit 102, and the second area corresponds to the area of the image preprinted on the sheet. In addition, the inspection image control unit 226 carries out second generation processing for composing reference image data from the preprint image data for preprinting and the image data generated from the PDL data. The inspection image control unit 226 also carries out processing for descreening halftone image data in accordance with the procedure in the flowchart described below. In the descreening processing, the halftone image data generated by the screening processing undergoes processing inverse to the screening processing. In other words, the original continuous tone image data is restored from the halftone image data by the descreening processing.

A screen information storage unit 224 stores information on the screening processing (hereinafter, referred to as screen information) transmitted from the other image forming apparatus (not illustrated) via the LAN 208 in response to a request from the inspection image control unit 226. The screen information storage unit 224 stores the screen information including, for example, information on the number of lines in the screen and the screen angle. Specifically, the inspection image control unit 226 associates the image data preprinted on the sheet or the screen data of this image data with identification information of the other image forming apparatus and stores the result into the screen information storage unit 224.

Here, the other image forming apparatus, which is not illustrated in FIG. 1, refers to an image forming apparatus that is connected to the image forming apparatus 101 via the LAN 208, and prints the preprint image data on a recording sheet to output a preprint sheet (hereinafter, referred to as a preprint image forming apparatus).

Internal blocks of the preprint image forming apparatus are similar to those of the image inspection controller 220 illustrated in FIG. 2, and the preprint image data is stored in a bitmap data generation unit in the preprint image forming apparatus. In addition, screen information that has been used for printing of the preprint sheet is stored in a print image processing unit in the preprint image forming apparatus (not illustrated).

Upon receiving a request for data from the image forming controller 200, an image forming control unit in the preprint image forming apparatus transmits the preprint image data stored in the bitmap data generation unit and the screen information stored in the print image processing unit. Thus, the image forming controller 200 can obtain the image data preprinted on the sheet or the screen data of this image data from the other image forming apparatus.

The image forming controller 200 may transmit the request when the user configures settings for the preprint image forming apparatus using an inspection operation unit 227. The user operates the inspection operation unit 227 to set an image quality inspection level for an area that corresponds to the image data preprinted on the sheet or for an area in which the aforementioned area overlaps an area that corresponds to the image data generated by the bitmap data generation unit 206.

The area information storage unit 225 stores information indicating a preprint print area (hereinafter, referred to as a preprint area) that is based on the preprint image data and information indicating the location of the document area. The inspection image control unit 226 can compare the pieces of area information stored in the area information storage unit 225 to determine whether the two areas overlap each other.

The inspection image control unit 226 integrally controls the processing units of the image inspection controller 220. The inspection image control unit 226 can make a determination based on information stored in each processing unit of the image inspection controller 220 or can process data stored in each processing unit to generate necessary data.

In addition, the inspection image control unit 226 can cooperate with the image forming control unit 204. Thus, the inspection image control unit 226 can carry out control to request information necessary in the image inspection controller 220 via the LAN 208 and to store, into a suitable processing unit, the information received via the LAN 208 in response to the request. Furthermore, the inspection image control unit 226 can request image data and information from the other image forming apparatus via the LAN 208. The inspection image control unit 226 can also carry out control to store the information transmitted in response to the request into a suitable processing unit.

The inspection operation unit 227 includes an operation panel, through which the user carries out various operations pertaining to the image inspection, and transmits setting information input by the user to the inspection image control unit 226. In addition, the inspection operation unit 227 transmits, to the inspection image control unit 226, information input by the user on the image forming apparatus that has printed the preprint sheet. An inspection display unit 228 displays, to the user, a result of the image quality inspection and items to be set for the inspection.

A memory unit 229 includes a processing memory for the image inspection controller 220 to carry out various processes and a program memory for storing a processing program.

The reference image storage unit 230 stores reference data that has been composed by the inspection image control unit 226 from the bitmap data obtained by the bitmap data generation unit processing the document image data 206 and the preprint image data stored in the bitmap data storage unit 223.

An image comparison determination unit 231 compares the inspection image data, which is obtained by the inspection image control unit 226 carrying out predetermined image processing on the read image data stored in the scan image data storage unit 222, with the reference data stored in the reference image storage unit 230. The image comparison determination unit 231 then determines whether the image quality of the print material is good based on the result of the comparison in accordance with the preset image quality inspection level. This result of the determination is transmitted to the finishing unit 104. In the first exemplary embodiment, the image comparison determination unit 231 compares the inspection image data stored in the scan image data storage unit 222 with the image data generated from the PDL data or with the reference image data (i.e., image data that has been composed from the image data generated from the PDL data and the image data generated from the preprint data) to inspect the image quality.

Subsequently, the image quality inspection carried out by the image inspection unit 103 of the first exemplary embodiment will be described. The image quality inspection is carried out as the processing units illustrated in FIG. 2 cooperate under the control of the inspection image control unit 226.

In the image quality inspection, the inspection image data that has been read by the inspection scanner 221 and stored in the scan image data storage unit 222 is compared with the reference data generated based on the bitmap data to determine whether there is a difference on a pixel-by-pixel basis, and thus the print quality of the print material is inspected. If the difference is less than a threshold value, the image quality of the print material is determined to be good, and if the difference is equal to or greater than the threshold value, the image quality is determined not to be good.

FIG. 5A illustrates exemplary threshold values to be preset by the user. If the user sets the level associated with the inspection level to high, the image quality is determined to be good when the mismatch pixel count is 10 or less. If the user sets the level to medium, the image quality is determined to be good when the mismatch pixel count is 50 or less. If the user sets the level to low, the image quality is determined to be good when the mismatch pixel count is 100 or less.

FIG. 5A illustrates an example where the user sets the multiple image quality inspection levels and the mismatch pixel counts serving as the threshold values are set accordingly. Alternatively, the user may set the threshold values.

The image quality inspection is carried out in two modes. In one mode of the image quality inspection, a recording sheet on which the document image data is to be printed is not a preprint sheet, and in the other mode of the image quality inspection, a recording sheet on which the document image data is to be printed is a preprint sheet.

The image quality inspection, when the recording sheet is not a preprint sheet, is carried out by comparing the inspection image data with the rendered document image data stored in the reference image storage unit 230, for example, on a pixel-by-pixel basis. At this time, the inspection image data is generated by subjecting the scan image data to predetermined image processing, or specifically, the screening processing, using the screen information stored in the print image processing unit 201.

In other words, the document image data that has been rasterized from the PDL data serves as the reference data, and the inspection image data obtained by subjecting the scan image to the screening processing using the screen information stored in the image forming apparatus 101 is compared with the reference data.

On the other hand, in the image quality inspection in the case where the recording sheet is a preprint sheet, the reference data is composed from the rendered document image data and the preprint image data received via the LAN 105. The inspection image data is obtained by subjecting the scan image data to the descreening processing using the screen information in the image printing unit 102 and the screen information in the preprint image forming apparatus received via the LAN 105.

In other words, the document image data rasterized from the PDL data does not as-is serve as the reference data and needs to be combined with the preprint image data. In addition, the inspection image data needs to be obtained by subjecting the scan image to the screening processing in areas corresponding to the screen information stored in the image forming apparatus 101 and the screen information stored in the preprint image forming apparatus, respectively.

Here, what types of difference can exist between the reference data and the inspection image data in the image quality inspection will be discussed with examples.

For example, a difference may result from the paper deforming as being bent or wrinkling while being conveyed by the image forming apparatus, or from a printing defect such as blurring and dusts caused by the developer scattering. Such a difference should be detected in the image quality inspection since that difference indicates that the print material simply differs from the print data.

Meanwhile, unlike the above case, there is a case where a difference is determined to be present due to a difference in reading precision or printing precision between the scan image data and the reference data. In an exemplary case, while the reference data is a continuous tone digital gray scale or color image, the scan image data is a halftone image having undergone the screening processing.

If the print material has undergone the screening processing, the print material is subjected to image processing for converting the image into data that can be compared with the reference data, using the screen information indicating what type of screening processing has been carried out on the print material. The image processing here corresponds specifically to processing for blurring the halftone image characteristics to smooth the image. With this image processing, the halftone dot characteristics of the halftone image are blurred, and the frequency characteristics are reduced to suppress occurrence of moire. This image processing will be referred to as descreening processing, hereinafter.

The screen information includes either the number of lines in the screen or the screen angle and is unique to each image forming apparatus and to each print setting.

The screen information obtained from the preprint image forming apparatus may include specifically a dither matrix. The dither matrix is for reducing the color by comparing the original image data of the same size as the matrix with each piece of data in the matrix and plotting if the value of the original data is equal to or greater than the value of the matrix. Analyzing this dither matrix makes it possible to obtain the number of lines in the screen or the screen angle for each of the colors Cyan (C), Magenta (M), Yellow (Y), and Black (K).

Furthermore, as the screen information obtained from the preprint image forming apparatus, the number of lines in the screen or the screen angle for each of the colors C, M, Y, and K obtained by analyzing the dither matrix in the preprint image forming apparatus may be obtained.

Subsequently, image processing for generating the inspection image data will be described.

To compare the inspection image data with the reference data, the descreening processing for reducing the frequency characteristics of the inspection image data is necessary. The frequency characteristics of the screen image can be found from the information on the number of lines in the screen and the screen angle obtained in the form of the screen information. Thus, in the descreening processing, calculation is carried out using a filter according to the frequency characteristics.

For example, if the number of lines is 150 and the angle is 115°, a filter that cuts off high frequencies is used. If the number of lines is 100 and the angle is 85°, a filter that cuts off low frequencies is used. In this manner, by selecting a filter to be used based on the number of lines and the angle in the screen information, an image in which the frequency characteristics of the screen image are reduced can be generated.

Here, this filter according to the frequency characteristics may be obtained from the preprint image forming apparatus or may be generated in the image forming apparatus 101 from the screen information.

A case where the screen information cannot be obtained from the image forming apparatus that has printed the preprint sheet and thus proper descreening processing cannot be carried out will be described.

If a filter that cuts off low frequencies is mistakenly used when the number of lines is 150 and the angle is 115°, frequency characteristics that do not need to be cut off are cut off, and thus a blurred image is generated. If a filter that cuts off high frequencies is mistakenly used when the number of lines is 100 and the angle is 85°, the low frequency characteristics of the screen image cannot be reduced, and thus moire is generated.

In this manner, the inspection image data generated when proper descreening processing cannot be carried out, a difference between such inspection image data and the reference data increases, and thus the image quality is determined not to be good.

As described thus far, selecting an appropriate filter based on the screen information and carrying out the descreening processing make it possible to generate inspection image data in which the frequency characteristics are reduced. A difference is then not generated in the image quality inspection in which the inspection image data with reduced frequency characteristics is compared with the reference data, and thus the image quality is determined to be good.

As the descreening processing using the screen information, a method in which image processing is carried out while switching a filter to be used based on the number of lines in the screen and the screen angle has been described. The descreening processing, however, is not limited to such image processing and may be any image processing through which the screen characteristics can be reduced using the screen information.

In the first exemplary embodiment, bitmap data is rasterized from the document image data for image printing in the bitmap data generation unit 206. At this point, the image forming control unit 204 analyzes the bitmap data processed in the bitmap data generation unit 206 to determine a document area and stores the result of the determination, namely the area information, into the area information storage unit 225. The bitmap data processed in the bitmap data generation unit 206 is stored in the reference image storage unit 230.

Meanwhile, the bitmap data received from the preprint image forming apparatus is stored in the bitmap data storage unit 223. At this point, the inspection image control unit 226 analyzes the bitmap data stored in the bitmap data storage unit 223 to determine a document area and stores the result of the determination, namely the area information, also into the area information storage unit 225.

Figure 3:
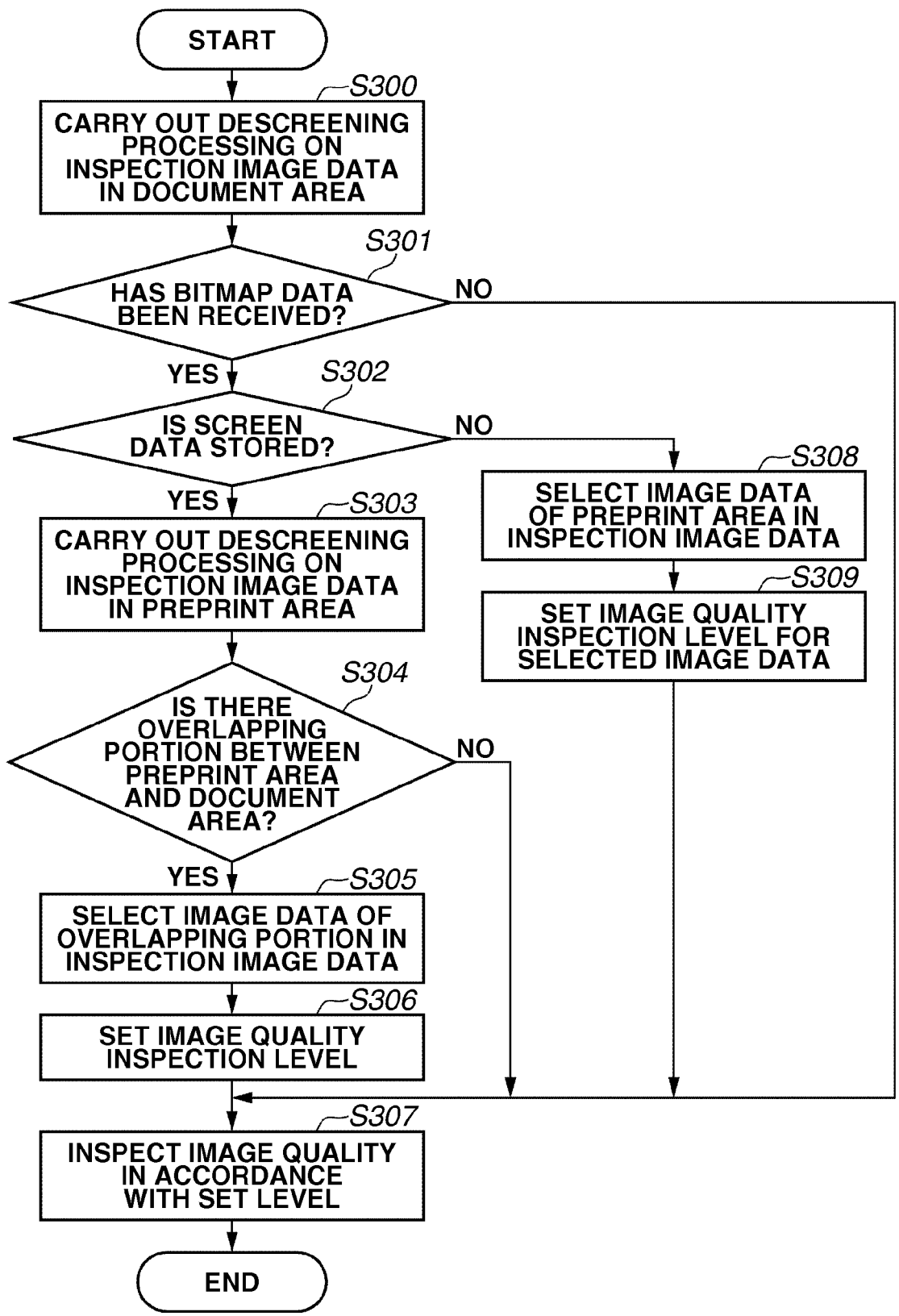
FIG. 3 is a flowchart for illustrating a method for controlling the image forming apparatus.

FIG. 3 is a flowchart for illustrating a method for controlling the image forming apparatus of the first exemplary embodiment. This is an example of image quality inspection processing carried in the image forming apparatus 101. The image inspection controller 220 is realized by the CPU, the ROM, the RAM, and the HDD (none of which are illustrated) cooperating with one another. The ROM or the HDD stores a program for implementing each processing unit of the image inspection controller 220 illustrated in FIG. 2, and the CPU develops and executes the program in the RAM to implement the processing flow illustrated in FIG. 3. Note that the control is described using the processing units illustrated in FIG. 2.

Upon the image quality inspection being started, in step S300, the inspection image control unit 226 carries out the descreening processing on an image in the document area. At this time, the screen information necessary for the descreening processing can be obtained by the inspection image control unit 226 requesting the information from the print image processing unit 201. In addition, the document area can be obtained in the form of area information by the image forming control unit 204 making an area determination of the image data generated in the bitmap data generation unit 206. In step S301, the inspection image control unit 226 determines whether the preprint image data received via the LAN 208 is stored in the bitmap data storage unit 223. Thus, the inspection image control unit 226 determines whether the bitmap data of the preprint image has been received. If the preprint image data is stored in the bitmap data storage unit 223, the inspection image control unit 226 determines that the bitmap data of the preprint image has been received.

Here, if the inspection image control unit 226 has determined that the preprint image data is stored in the bitmap data storage unit 223, the inspection image control unit 226 determines to carry out the image quality inspection for the case where a preprint sheet is used, and the processing then proceeds to step S302.

Meanwhile, if the inspection image control unit 226 has determined that the preprint image data is not stored in the bitmap data storage unit 223, the inspection image control unit 226 determines to carry out the image quality inspection for the case where a preprint sheet is not used, and the processing then proceeds to step S307.

Here, the image data may be stored into the bitmap data storage unit 223 when the user configures settings for using a preprint sheet through the inspection operation unit 227 in the image forming apparatus 101.

When the user configures settings for using a preprint sheet through the inspection operation unit 227, the inspection image control unit 226 carries out display in the inspection operation unit 227 prompting the user to input device information so that the inspection image control unit 226 can specify the preprint image forming apparatus.

When the user inputs, to the inspection operation unit 227, information that allows the inspection image control unit 226 to specify the preprint image forming apparatus, the inspection image control unit 226 requests the preprint image forming apparatus (not illustrated) to transmit bitmap data and screen information via the LAN 208.

The preprint image forming apparatus responds to the request transmitted from the image forming apparatus 101 and transmits the bitmap data stored in the bitmap data generation unit of the preprint image forming apparatus and the screen information in the print image processing unit via the LAN 208.

When the image forming apparatus 101 receives the bitmap data and the screen information on the preprint from the preprint image forming apparatus via the LAN 208, the inspection image control unit 226 stores the preprint bitmap data into the bitmap data storage unit 223. In addition, the inspection image control unit 226 stores the screen information into the screen information storage unit 224. The inspection image control unit 226 also analyzes the bitmap data stored in the bitmap data storage unit 223 to determine a preprint area and stores the result of the determination, namely the location information, into the area information storage unit 225.

In step S302, the inspection image control unit 226 determines whether the screen information is stored in the screen information storage unit 224. If the inspection image control unit 226 determines that the screen information is stored in the screen information storage unit 224, the processing proceeds to step S303. Meanwhile, if the inspection image control unit 226 determines that the screen information is not stored in the screen information storage unit 224, the processing proceeds to step S308.

In step S303, the inspection image control unit 226 carries out the descreening processing on the preprint area while referring to the location information stored in the area information storage unit 225 and using the screen information stored in the screen information storage unit 224. When the image processing is finished, the processing proceeds to step S304.

In step S304, the inspection image control unit 226 determines whether the preprint area and the document area overlap each other based on the location information stored in the area information storage unit 225. If the inspection image control unit 226 determines that the two areas overlap each other, the processing proceeds to step S305. Meanwhile, if the inspection image control unit 226 determines that the two areas do not overlap each other, the processing proceeds to step S307.

The area information stored in the area information storage unit 225 will now be described in detail. The location information that indicates a print area and that has been obtained by analyzing the received bitmap data is stored in the area information storage unit 225.

Figure 4:
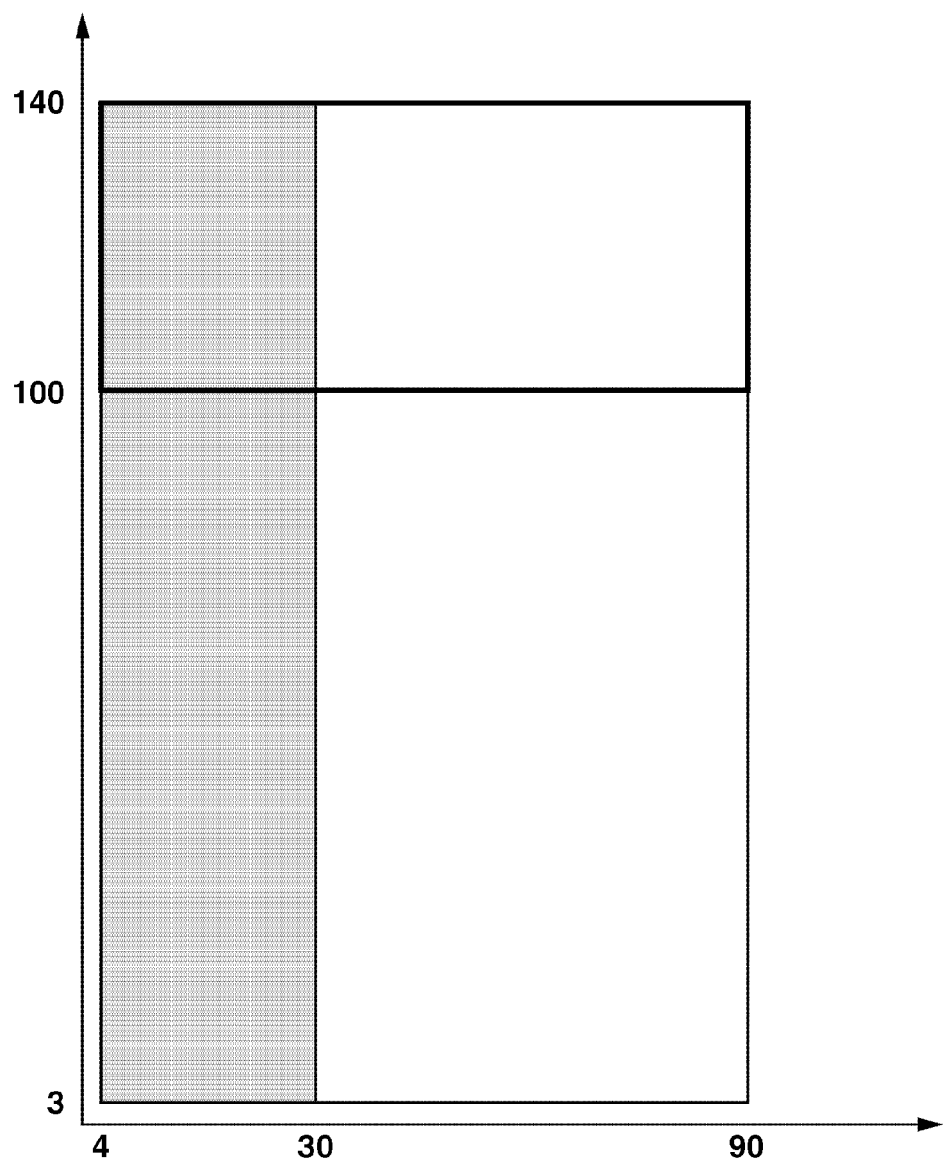
FIG. 4 is a diagram for illustrating an overlap between a preprint area and an area on which printing is to be performed.

An example will be described using a sheet illustrated in FIG. 4, in which the gray area is preprinted and printing is to be carried out in the black-bordered area. The following location information on the print area of the preprint sheet is stored.

Area 1: (3,4) (3,30) (140,4) (140,30)

This area indicates a rectangular shape having vertices at the aforementioned four coordinates. The black-bordered rectangular area may, for example, be set as the document area, and "Area 2: (100,4) (100,90) (140,4) (140,90)" may be stored as the location information thereof. In that case, the inspection image control unit 226 can obtain "Area 3: (100,4) (100,30) (140,4) (140,30)" as an overlapping portion based on the aforementioned two pieces of area information.

In this manner, the inspection image control unit 226 can determine the overlapping portion using the coordinate data stored in the area information storage unit 225 as the area information.

Here, the area information stored in the area information storage unit 225 does not need to be the vertex coordinates of the rectangle as illustrated above. Alternatively, area information of a complex shape may be stored, or area information may be of any type of information aside from the vertex coordinate data as long as the area information allows the print area to be determined.

In step S305, the inspection image control unit 226 determines whether an overlapping portion is present based on the scan image data in the scan image data storage unit 222 while referring to the area information stored in the area information storage unit 225. If the inspection image control unit 226 determines that there is an overlapping portion, the inspection image control unit 226 selects that portion.

In step S306, the user sets the image quality inspection level for the portion selected in step S305. The user sets the image quality inspection level for the selected portion by, for example, selecting a level among the levels displayed on the inspection display unit 228 through the inspection operation unit 227. At this time, the levels displayed on the inspection display unit 228 are ones that are lower than the image quality inspection level preset by the user.

Specifically, if the user has preset the image quality inspection level to high, the inspection display unit 228 displays two levels, namely medium and low, to prompt the user to make a selection. When the user selects medium, the inspection image control unit 226 resets the image quality inspection level for the overlapping portion to medium and inspects the image quality of the non-overlapping portion at the high level and the image quality of the overlapping portion at the medium level.

Here, an example where the user selects the image quality inspection level for the overlapping portion has been described. Alternatively, the inspection image control unit 226 may automatically set a level that is lower than the preset image quality inspection level. The settings of the image quality inspection level will now be described in detail with reference to FIGS. 5A and 5B.

In the image quality inspection, a portion that has undergone proper descreening processing matches the reference image at a high rate. A portion on which the screen information is not available or that has undergone descreening processing using wrong screen information, however, matches the reference image at a low rate.

FIG. 5A illustrates a case with three setting levels. In the example illustrated in FIG. 5A, when the user sets the image quality inspection level to high, the number of mismatches between the inspection image data and the reference image is 10 or less. When the user sets the image quality inspection level to medium, the number of mismatches between the inspection image data and the reference image is 50 or less. When the user sets the image quality inspection level to low, the number of mismatches between the inspection image data and the reference image is 100 or less.

In other words, when the user sets the image quality inspection level to low, the image quality is determined to be good if the number of mismatches between the inspection image data and the reference image is 100 or less. Meanwhile, when the user sets the image quality inspection level to high, the image quality is determined to be good only if the number of mismatches between the inspection image data and the reference image is 10 or less.

In this manner, the user can set the image quality inspection level in accordance with a matching degree between the inspection image data and the reference image. This image quality inspection level is preset by the user, and the image forming apparatus 101 carries out the image quality inspection according to the set level.

In step S307, the inspection image control unit 226 informs the image comparison determination unit 231 of the level set in step S305, and the image comparison determination unit 231 carries out the image quality inspection according to the set level.

Meanwhile, in step S302, if the inspection image control unit 226 determines that the bitmap data has been received but the screen data has not been received, the processing proceeds to step S308.

In step S308, the inspection image control unit 226 analyzes the bitmap data stored in the area information storage unit 225 to analyze where the preprint area lies. Based on the result of the analysis, the inspection image control unit 226 selects image data of an area that has been determined to be a preprint area. In step S309, the inspection image control unit 226 sets the image quality inspection level for the selected image data. Thereafter, the processing proceeds to step S307, and the image comparison determination unit 231 carries out the image quality inspection according to the set level. In the first exemplary embodiment, the inspection image control unit 226 carries out control to change a threshold value to be used by the image comparison determination unit 231 to determine the image quality, according to the set image quality inspection level.

According to the first exemplary embodiment, even in the case where printing is carried out using a preprint sheet, the inspection image data obtained by subjecting the scan image data to proper image processing can be generated. This in turn makes it possible to compare the inspection image data with the reference image, enabling a suitable image quality inspection to be carried out with high precision.

Hereinafter, a second exemplary embodiment will be described.

In the first exemplary embodiment described above, if the preprint area does not overlap the document area, the descreening processing has been carried out using the screen information obtained when the other image forming apparatus has printed the preprint data, and thus the precision in the image quality inspection on the preprint area has been increased.

When the preprint sheet is output from the other image forming apparatus in an ideal condition, the image quality in the preprint area should be ensured. Based on this assumption, in the second exemplary embodiment, the image quality inspection level is set even lower for a portion of the preprint area that does not overlap the document area, and thus reducing likelihood of an image defect to be detected.

This configuration suppresses false detection of image defects in the preprint area, which are caused by an unexpected change in the state of the inspection scanner 221. Note that processing similar to that of the first exemplary embodiment is carried out on a portion of the preprint area that overlaps the document area.

FIG. 6 is a flowchart of illustrating a method for controlling the image forming apparatus of the second exemplary embodiment. This is an example of image quality inspection processing carried out in the image forming apparatus 101. The image inspection controller 220 is realized by the CPU, the ROM, the RAM, and the HDD (none of which are illustrated) cooperating with one another. The ROM or the HDD stores a program for implementing each processing unit of the image inspection controller 220 illustrated in FIG. 2, and the CPU develops and executes the program in the RAM to implement the processing flow illustrated in FIG. 6. The control is realized by the inspection image control unit 226 illustrated in FIG. 2 integrally controls each processing unit. In steps S600 to S603, processes similar to those in steps S300 to S303 are carried out.

In step S604, as in step S304, the inspection image control unit 226 determines whether the preprint area and the document area overlap each other based on the location information stored in the area information storage unit 225. If the inspection image control unit 226 determines that the two areas overlap each other, the processing proceeds to step S605. Meanwhile, if the inspection image control unit 226 determines that the two areas do not overlap each other, the processing proceeds to step S610. Thereafter, in steps S605 to S609, processes similar to those in steps S305 to S309 are carried out.

In step S610, the inspection image control unit 226 selects a portion in which the preprint area and the document area are determined not to overlap each other in step S604. In step S611, the inspection image control unit 226 sets the image quality inspection level on the portion selected in step S610 (i.e., non-overlapping portion).

The image quality inspection level are set in accordance with a data table illustrated in FIG. 5B. The data table in FIG. 5B differs from the data table in FIG. 5A in that the level "none" is added below the level "low." When the level "none" is set, an image defect is not detected in the non-overlapping portion.

For example, the mismatch pixel count is set to "unlimited" in the level "none." "Unlimited" here specifically means that a pixel count that is equal to or less than the pixel count in the scan image data is set. In other words, no matter how many mismatch pixels are detected in the scan image data, the mismatch pixel count is not detected as an image defect, and thus false detection of an image defect in a portion of the preprint area that does not overlap the document area is prevented.

In step S607, as in step S307, the inspection image control unit 226 carries out the image quality inspection on each area of the scan image data according to the set inspection level.

Thus far, the processing flow in the second exemplary embodiment has been described. This processing flow suppresses false detection of image defects in the preprint area, which are caused by an unexpected change in the state of the inspection scanner 221. In addition, the image quality inspection, as in the first exemplary embodiment, is carried out on a portion of the preprint area that overlaps the document area, and thus an image defect in the document area can be detected appropriately.

Note, in the second exemplary embodiment, that the inspection level on the non-overlapping portion is set to "none," and thus an image defect is prevented from being detected. Alternatively, control may be carried out such that the image quality inspection is not carried out on the non-overlapping portion. In other words, the second exemplary embodiment encompasses a configuration in which the inspection image control unit 226 does not carry out the image quality inspection on a portion on which the inspection level is set to "none."

According to the exemplary embodiments described thus far, the image quality inspection can be carried out without being affected by the preprint printing.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-274643 filed Dec. 17, 2012, which is hereby incorporated by reference herein in its entirety.

What is claimed is:

1. An inspection apparatus comprising:
    a receiving unit configured to receive second image data used in preprinting the second image on a sheet, and first image data used in further printing the first image on the preprinted sheet;
    a composing unit configured to compose reference image data from the received second image data and the received first image data;
    a reading unit configured to print the first image on the sheet, on which the second image has been printed using the second image data, using the first image data and to read the printed sheet, to obtain read image data;
    a processing unit configured to carry out smoothing processing using screen information that has been used in preprinting the second image with respect to a second area where, of the read image data, the second image has been preprinted, and configured to carry out smoothing processing using screen information that has been used in printing the first image with respect to a first area where, of the read image data, the first image has been printed, to generate inspection image data; and
    an inspecting unit configured to inspect the sheet on which both the second image data and the first image data have been printed, by comparing the inspection image data with the reference image data.

2. The inspection apparatus according to claim 1,
    wherein the inspecting unit inspects printed sheet by comparing a difference between a pixel value of a pixel included in the reference image data and a pixel value of a pixel included in the inspection image data with a threshold value, and
    wherein a threshold value to be used by the inspecting unit to inspect a portion in which the first area and the second area overlap each other differs from a threshold value to be used by the inspecting unit to inspect a portion in which the first area and the second area do not overlap each other.

3. The inspection apparatus according to claim 2, wherein the threshold value to be used by the inspecting unit to inspect the portion in which the first area and the second area overlap each other is greater than a threshold value to be used by the inspecting unit to inspect a portion of the first area that does not overlap the second area.

4. The inspection apparatus according to claim 2, wherein a threshold value to be used by the inspecting unit to inspect a portion of the second area that does not overlap the first area is greater than the threshold value to be used by the inspecting unit to inspect the portion where the first area and the second area overlap each other.

5. The inspection apparatus according to claim 1, wherein the inspecting unit does not inspect a portion of the second area that does not overlap the first area.

6. The inspection apparatus according to claim 1, wherein the smoothing processing is processing for descreening halftone image data of the first and second image data.

7. The inspection apparatus according to claim 1, further comprising:
an obtaining unit configured to obtain screen data that has been used to preprint the second image on the sheet based on the second image data,
wherein the processing unit carries out the smoothing processing on the second area using the obtained screen data.

8. The inspection apparatus according to claim 1, further comprising:
a printing unit configured to print the first image data on the preprinted sheet.

9. An inspection system comprising:
a receiving unit configured to receive second image data used in preprinting the second image on a sheet, and first image data used in further printing the first image on the preprinted sheet;
a composing unit configured to compose reference image data from the received second image data and the received first image data;
a reading unit configured to print a first image on the sheet, on which the second image has been printed using the second image data, using the first image data and to read the printed sheet, to obtain read image data;
a processing unit configured to carry out smoothing processing using screen information that has been used in preprinting the second image with respect to a second area where, of the read image data, the second image has been preprinted, and configured to carry out smoothing processing using screen information that has been used in printing the first image with respect to a first area where, of the read image data, the first image has been printed, to generate inspection image data; and
an inspecting unit configured to inspect the sheet on which both the second image data and the first image data have been printed, by comparing the inspection image data with the reference image data.

10. The inspection system according to claim 9, further comprising:
a printing unit configured to print the first image data on the preprinted sheet.

11. The inspection system according to claim 9, wherein the inspecting unit does not inspect a portion of the second area that does not overlap the first area.

12. An inspection method comprising:
receiving second image data used in preprinting the second image on a sheet, and first image data used in further printing the first image on the preprinted sheet;
composing reference image data from the received second image data and the received first image data;
obtaining read image data by printing a first image on the sheet, on which the second image has been printed using the second image data, using the first image data and by reading the printed sheet;
generating inspection image data by carrying out smoothing processing using screen information that has been used in preprinting the second image with respect to a second area where, of the read image data, the second image has been preprinted, and by carrying out smoothing processing using screen information that has been used in printing the first image with respect to a first area where, of the read image data, the first image has been printed; and
inspecting the sheet on which both the second image data and the first image data have been printed, by comparing the inspection image data with the reference image data.

13. A non-transitory computer-readable storage medium storing a program that causes a computer to implement an inspection method, the inspection method comprising:
receiving second image data used in preprinting the second image on a sheet, and first image data used in further printing the first image on the preprinted sheet;
composing reference image data from the received second image data and the received first image data;
obtaining read image data by printing a first image on the sheet, on which the second image has been printed using the second image data, using the first image data and by reading the printed sheet;
generating inspection image data by carrying out smoothing processing using screen information that has been used in preprinting the second image with respect to a second area where, of the read image data, the second image has been preprinted, and by carrying out smoothing processing using screen information that has been used in printing the first image with respect to a first area where, of the read image data, the first image has been printed; and
inspecting the sheet on which both the second image data and the first image data have been printed, by comparing the inspection image data with the reference image data.

* * * * *